Sept. 22, 1964  B. COTTER ET AL  3,149,815
MANUAL SEAT ADJUSTER
Filed March 25, 1963  2 Sheets-Sheet 1

INVENTORS
Bart Cotter &
BY James D. Leslie
S.C. Thorpe
ATTORNEY

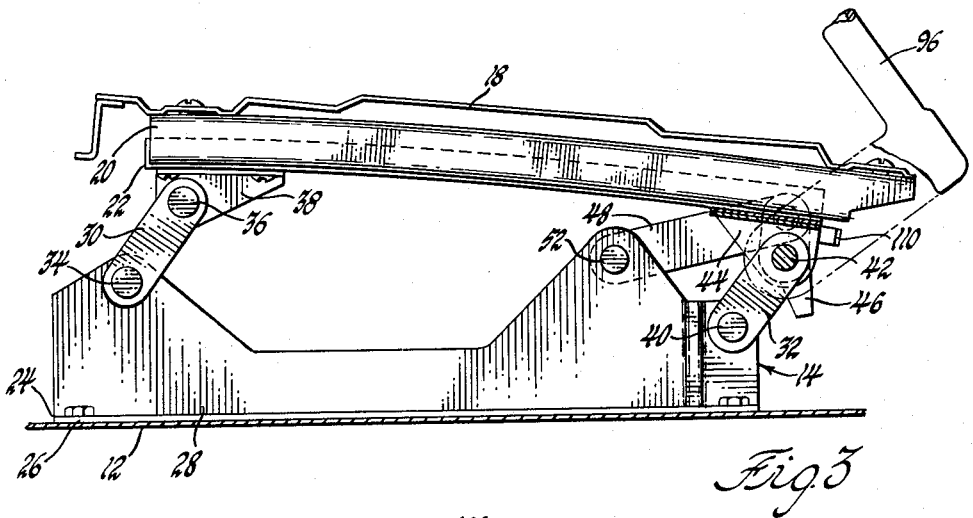
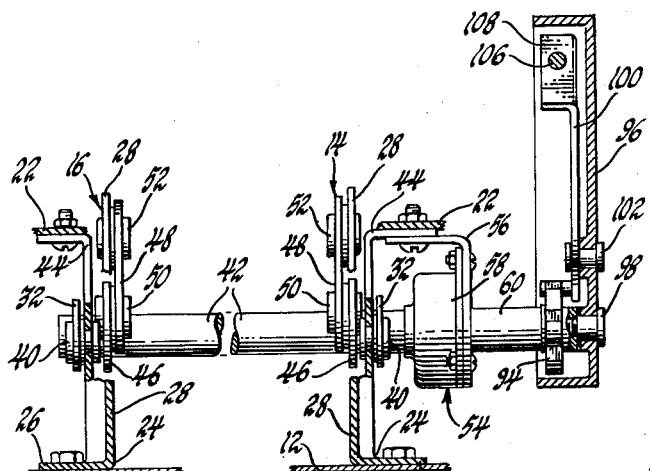
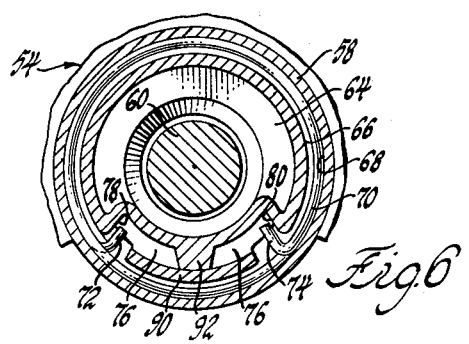
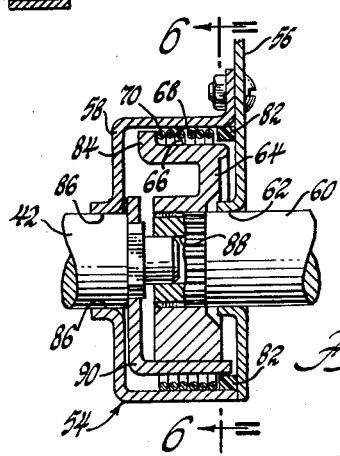
INVENTORS
Bart Cotter &
BY James D. Leslie
S.C. Thorpe
ATTORNEY United States Patent Office 3,149,815
Patented Sept. 22, 1964

3,149,815
MANUAL SEAT ADJUSTER
Bart Cotter, Bloomfield Hills, and James D. Leslie, Birmingham, Mich., assignors to General Motors Corporation, Detroit, Mich., a corporation of Delaware
Filed Mar. 25, 1963, Ser. No. 267,669
4 Claims. (Cl. 248—421)

This invention relates to seat adjusters of the type commonly used in motor vehicles and more particularly to those providing height adjustments by manual movement of linkages.

Such manual vertical seat adjusters conventionally employ either a lock bar and a series of notches or a pin with mating apertures to secure the seat at a limited number of pre-selected intervals of vertical adjustment. The present invention controls the vertical adjustment through a bi-directional, anti-back drive coupling which permits adjustment to an infinite number of vertical positions within the limits of the vertical linkage.

According to a preferred embodiment of the invention, a toggle linkage is connected to the output shaft of the drive coupling to control and to limit the adjustment of the vertical linkage when the output shaft is driven by manually rotating the input shaft of the coupling.

These and other objects of the invention will become more apparent as reference is had to the accompanying specification and drawings wherein:

FIGURE 3 is a view similar to FIGURE 2 except showing the parts in the uppermost adjusted position of the seat.

FIGURE 4 is a view substantially along the line 4—4 of FIGURE 2, with sections cut away, showing the position of the actuation handle, drive coupling and links when the seat is in the lowermost position.

FIGURE 5 is a sectional view of the bi-directional, anti-back drive coupling.

FIGURE 6 is a sectional view substantially along line 6—6 of FIGURE 5 illustrating the position of the coupling elements.

Figure 1:
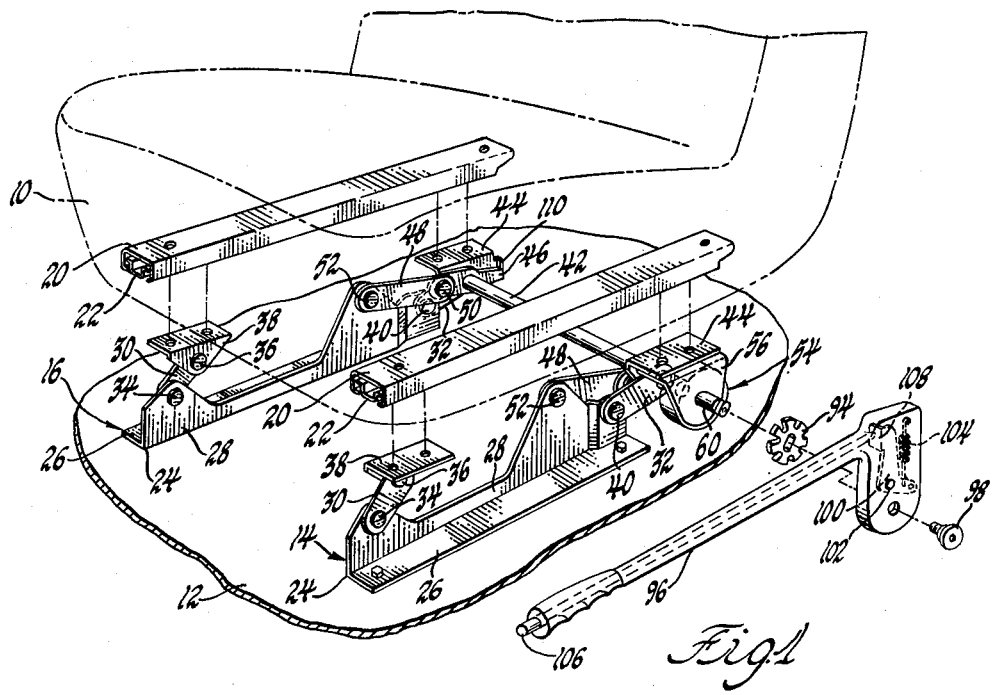
FIGURE 1 is an exploded view in perspective of a pair of spaced adjuster units incorporating the present invention and supporting a seat (in phantom lines) on a vehicle floor.
Figure 2:
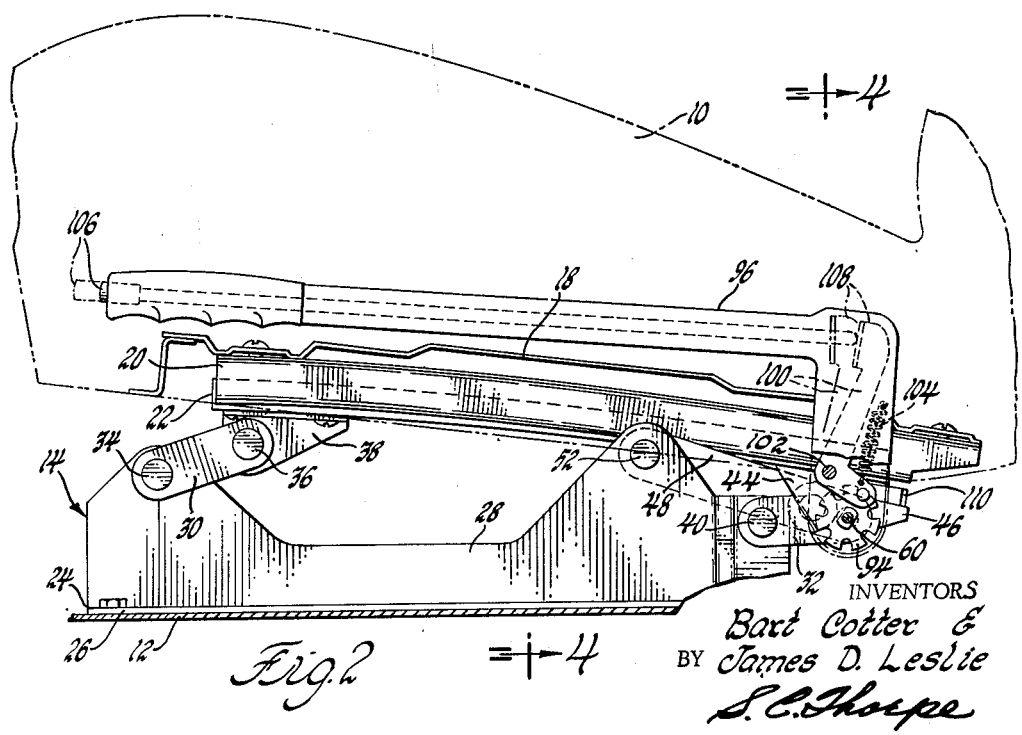
FIGURE 2 is a left side view thereof, showing the parts in the lowermost adjusted position of the seat.

Referring now to the drawings and more particularly to FIGURES 1 and 2, a vehicle seat 10, shown in phantom lines, is supported on a surface or vehicle floor 12 by a pair of spaced adjusting means or units indicated generally by the numerals 14, 16. The units 14, 16 are similar left and right hand units, therefore only the left hand adjuster unit 14 need be described and duplicate numbers will be used where applicable.

The seat 10 is mounted on a seat frame 18 which is secured to the upper track 20 of a conventional manual horizontal seat adjuster mechanism. The upper track 20 is in mating engagement with a lower track 22 for generally horizontal sliding movement to provide fore and aft adjustment of the seat 10. A conventional latching means, not shown, is provided to secure the two tracks from motion relative to each other. Inasmuch as the horizontal adjusting structure provides no part of the present invention, there will be not further description thereof.

An L-shaped lower support member 24 has the base portion 26 of the L supported and secured on the floor 12, and the upwardly extending arm 28 pivotally supports vertical linkages in the form of parallel front and rear links 30, 32.

The front link 30 has one end pivotally secured to arm 28 by pivot pin 34 and the other end pivotally connected by pivot pin 36 to a front upper support bracket 38 which is rigidly secured to the lower track 22. The rear link 32 has one end pivotally secured to arm 28 by pivot pin 40. The other end of link 32 is pivotally connected to output shaft 42 which is rotationally supported in a rear upper support bracket 44 secured, by suitable means, to the lower track 22. The front support bracket 38, lower track 22 and rear support bracket 44 form a rigid unit which acts as the upper support member of the vertical adjusting unit.

Control means for the vertical linkage is provided by a toggle linkage having one link 46 fixedly secured to output shaft 42 and pivotally secured to the other link 48 of the toggle by a pivot pin 50. The other end of link 48 is pivotally secured to lower support arm 28 by a pivot pin 52.

A bi-directional, anti-back drive coupling, as best seen in FIGURES 1, 4, 5 and 6 and indicated generally by the numeral 54, is supported by a bracket 56 which is secured by suitable means to the lower track 22. The coupling 54 includes a cylindrical housing or case 58 which is secured by suitable means to bracket 56. The bracket 56 further acts as a cover for the case 58 and rotatably receives an input shaft 60 through an aperture 62 therein. A spring retainer or hub 64, secured to the input shaft and located within the housing 58, is provided with a cylindrical wall 66 located in radially spaced relationship to the inner wall 68 of the housing 58. A helical coil spring 70 fits within the annular space between the housing 58 and retainer 64, with the coils of the spring being in frictional engagement with the inner wall 68 of the housing. The ends 72, 74 of the spring 70 are bent radially inwardly and are received with an axially extending slot 76 in the retainer. The bent ends 72, 74 are located in adjacent spaced relationship to the respective radial walls 78, 80 of slot 76. A nylon or polyethylene ring or washer 82 seats within the housing 58 between the spring 70 and cover 56 with the terminal coil respective to the bent end 74 of the spring 70 slidably seating on the ring 82 to locate this terminal coil and prevent the bent ends 74 from slipping out of one end of the retainer slot 76. The spring retainer 64 is further provided with a radially extending annular flange 84 which seats and locates the other terminal coil of spring 70 and prevents the other bent end 72 from slipping out of the other end of the retainer slot 76. Flange 84 bears against housing 58 and provides bearing for the end of the drive shaft 60.

The output shaft 42 passes into the housing 58 through an aperture 86. The end of output shaft 42 is of reduced diameter and is rotatably supported in a bearing hole 88 formed in the end of input shaft 60. An L-shaped drive key 90 is fixedly secured to the reduced end of drive shaft 42. The end of key 90 is of circular cross section and is received within the slot 76 intermediate the bent ends 72, 74 of the spring 70, as best seen in FIGURE 6. An axially extending rib 92 located intermediate the walls 78, 80 of the retainer slot 76 has an arcuate outer surface which provides a bearing seat for the key 90 to accurately locate this key portion in radial directions and prevent radial tilting movement of the key with respect to the bent ends of the spring 70.

As best seen in FIGURES 1 and 2, an indexing washer 94 is secured to the end of input shaft 60. Means to actuate the input shaft 60 is provided by a handle 96 rotationally secured thereto about index washer 94 by a pivot stud 98. A latch element 100 is pivotally mounted in the handle 96 by pivot pin 102 and is positioned to be pivoted into and out of engagement with indexing washer 94. A spring 104 normally biases the latching element 100 out of engagement with indexing washer 94. A plunger element 106 is mounted in handle 96 and bears on the tab 108 of latch element 100. When the plunger 106 is depressed, as shown in solid lines in FIGURE 2, the latch element 100 is pivoted into engagement with indexing washer 94. The plunger 106 is normally held in the extended position, as shown by dotted lines in FIGURE 2, by the spring 104 acting through the locking lever 100.

The toggle linkage is also used to limit the vertical movement of the seat adjuster. The end of toggle link 46 is extended beyond the fixed connection to output shaft 42 for contacting a stop means in the form of tab 110 extending from bracket 44 to limit the downward adjustment of the seat when the toggle linkage is extended, as best seen in FIGURES 1 and 2. Upward adjustment of the seat occurring with folding of the toggle linkage from extended position is limited by interference of toggle link 48 with output shaft 42, as best seen in FIGURE 3.

To adjust the seat vertically, the plunger 106 is depressed causing the latch element 100 to pivot into engagement with the indexing washer 94. Then as the handle 96 is rotated in either direction, the input shaft 60 will be rotated therewith. As can be seen best in FIGURES 5 and 6, as the input shaft 60 is rotated, the hub 64 will be rotated and one or the other of the radial walls 78, 80 of the retainer slot will engage a respective bent end 72, 74 of the spring 70 to partially wind up the spring in the direction of rotational movement of the input shaft. This will partially release the spring from frictional engagement with the inner surface 68 to allow the spring to rotate with the input shaft. Such rotation of the spring causes one or the other of its bent ends, upon engagement with its adjacent side of the key 90, to also rotate the output shaft 42 and thereby actuate the toggle linkage to vertically adjust the seat. When the seat is in any vertically adjusted position movement upwardly or downwardly therefrom, due to change in vertical loading thereof, is prevented by the frictional engagement of the spring 70 with the inner wall 68. Any such vertical movement of the seat will cause the key 90 to engage the adjacent bent ends 78, 80 of the spring and tend to unwind the spring, resulting in increased frictional engagement of the spring against the inner surface 68 of the coupling housing to resist such movement. When the seat is in its desired adjusted position, the plunger 106 is released and the handle 96 may be rotated to the stored position, as best seen in FIGURE 2.

While the preferred embodiment of the present invention has been shown and described herein, it is obvious that many structural details may be changed without departing from the spirit and scope of the invention as defined by the following claims.

We claim:

1. An adjusting means comprising an upper support member adapted to support a load, a lower support member adapted to be secured to a surface, adjustable linkage means vertically interconnecting said support members, said linkage means having a control means operatively connected thereto, a bi-directional, anti-back drive coupling having an input shaft and an output shaft, said output shaft being drivingly connected with said control means, and actuation means operatively connected to said input shaft of said coupling.

2. A vertical seat adjusting means comprising an upper support member adapted to support a seat, a lower support member adapted to be secured to a supporting surface, pivotably adjustable linkage means vertically interconnecting said support members, a bi-directional, anti-back drive coupling, said coupling having an input shaft and an output shaft, a control means comprising a toggle linkage operatively connected to said linkage means, said output shaft being operatively connected to said control means, and a manually actuatable handle drivingly connected to said input shaft for applying torque thereto.

3. Apparatus as claimed in claim 2 wherein said toggle linkage comprises a first and a second link, each of said links having one end pivotally secured to the other link, said first link being fixed to said output shaft, a stop means secured to said upper support member, and said first link cooperating with said stop means to limit vertical adjustment of said adjusting means in one direction.

4. Apparatus as claimed in claim 3 wherein the other end of said second link is pivotably secured to said lower support member, and said second link cooperates with said output shaft to limit vertical adjustment of said adjuster means in the other direction.

References Cited in the file of this patent

UNITED STATES PATENTS

| | | |
|---|---|---|
| 2,239,917 | Hunter et al. | Apr. 29, 1941 |
| 2,792,873 | Herider et al. | May 21, 1957 |
| 3,110,380 | Meyer et al. | Nov. 12, 1963 |